UNITED STATES PATENT OFFICE.

MATHILDE GROLL, OF VIENNA, AUSTRIA-HUNGARY.

PRODUCTION OF FERMENTATIVE PREPARATIONS.

1,179,625.  Specification of Letters Patent.  Patented Apr. 18, 1916.

No Drawing.  Application filed September 20, 1913. Serial No. 790,841.

*To all whom it may concern:*

Be it known that I, MATHILDE GROLL, a subject of the Emperor of Austria-Hungary, residing at Vienna, I, in Austria-Hungary, have invented certain new and useful Improvements in the Production of Fermentative Preparations, of which the following is a specification.

The object of this invention is to provide a process of producing bacterial and other ferments of durable and highly effective quality in a convenient form. It is well known that moisture is a very important factor in the maintenance of the efficiency and reproductiveness of micro-organisms. Nearly all bacteria are weakened, and ultimately perish, when subjected to a condition of dryness, unless they form spores. For this reason, various kinds of liquid bacterial preparations or cultures have been produced, but it has been found that chemical changes are liable to occur therein, which cause deterioration. To obviate or reduce such changes, moist preparations have been made, by forming a paste of bacteria or other micro-organisms, derived from pure culture, with sugar, almonds, nuts, chocolate, biscuit powder, meal or the like, the paste containing as a rule about 10 per cent. of moisture. Neither the paste as a whole, nor its individual constituents, have the property of remaining permanently moist, and the drying thereof is accompanied by crystallization of the sugar, the result being that the bacteria soon perish or at least suffer great loss of power of reproduction and activity. The constituents of the paste (ordinary sugar, malt sugar, nuts, almonds, meal and the like) are not wholly free from germs and impurities, so that the preparation in course of time becomes, as experience proves, sour and moldy. In certain cases the preparation (when containing almonds) smells like hydrocyanic acid. The insolvent constituents of the paste (nutmeal, etc.) also have the disadvantage that they form a sediment in the solvent employed when the preparation is taken into use, and that they impede solubility. All the moist preparations of bacteria which are manufactured up to this time are therefore not reliable.

The object of my invention is to obviate all the disadvantages enumerated and provide a preparation which remains permanently moist, maintaining the ferment in a fully active state, the process of manufacture being such as to wholly exclude impurities. To this end I use, in preparing the moist mass, not ordinary sugar, but sugar the crystallizing capacity of which has been reduced or destroyed, such sugar being known as fondant sugar. Such sugar is commonly prepared by boiling ordinary sugar to 40° or 45° of the sugar scale, with continual washing to prevent crystallization, then pouring same, with addition of some potato sugar or grape sugar, onto a marble plate, spraying it with water, and cooling it well and finally forming it into tablets or working it with a spatula. By this treatment the sugar is wholly sterilized, and deprived of its crystalline quality; it is obtained in the form of a non-drying paste which for a very long period retains about 22 or 24 per cent. of moisture. Fondant sugar also has the quality of being very readily and completely soluble in many liquids, and of very readily mixing with bacterial cultures and the vehicles thereof, also with various additions used, such as stains, ether and the like. Preparations made by adding bacterial cultures to fondant sugar are wholly sterile in regard to foreign germs, and the micro-organisms permanently retain their activity and power of reproduction or growth, by reason of the retention of moisture in the mass.

The process is applicable to all ferments which require moisture for maintenance of their activity and do not perish in sugar.

As an example, I will now describe the process of preserving the *Bacillus Bulgaricus*.

Good, rich milk is infected with a pure culture of the true *Bacillus Bulgaricus*, all bacteriological precautions being strictly observed, and is maintained at a temperature of 40° C. for two hours, to provide growth of the bacteria. The bacterial production of lactic acid during this period causes the milk to "turn". So much of the thin milk is then removed as to leave a cheese-like residue of the consistency of butter. This residue is carefully mixed, in equal parts, with fondant sugar, in the course of forming it into tablets above referred to. The mixture is thoroughly kneaded, to produce a soft, milky paste. Various admixtures may be introduced before the kneading, as for example phosphates, sulfates, carbonates, lactic acid salts, and the like, or organic acids, to promote bacterial growth, stains, fruit juices to improve flavor and odor, ether, etc. Other additions may be made for dietetic, medicinal or technical purposes. The kneaded product may be molded and enveloped with crystallic sugar, chocolate, paraffin or the like, or may be placed in a wrapper or other container to prevent drying. With this preparation Yoghurt milk can be readily prepared. Its flavor is superior to that of the preparations of a like nature, heretofore made. I have found that such preparations keep constantly their moisture and the bacteria remain living and retain their germinative faculty. Dangerous additions, or the access and more particularly the growth of foreign germs (mold, hay-bacillus, potato-bacillus, other germs of sickness or the like) are excluded. I have found that a sample $2\frac{1}{4}$ years old had retained its flavor without deterioration, and produced, in 11 hours at 42° C., normal Yoghurt milk.

Other bacteria capable of energetically decomposing sugar can, as already indicated, be kept active and reproductive in fondant sugar, more particularly the lactic acid bacteria, including those found in kefir, mazun, gioddu, sauerkraut, gherkins, etc., also many yeast funguses.

For preserving micro-organisms other than the lactic acid bacteria, the sugar mass is preferably added to whatever breeding vehicle best suits the organisms, such as broth, vegetable extract, starch, albumen solution, etc.

What I claim as my invention and desire to secure by Letters Patent of the United States is:—

1. The process of producing a fermentative preparation which consists in mixing with fondant sugar, micro-organisms capable of energetically decomposing sugar.

2. The process of producing a fermentative preparation which consists in mixing with fondant sugar, micro-organisms capable of energetically decomposing sugar and with an organic acid capable of promoting the growth of said micro-organisms.

3. The process of producing a fermentative preparation which consists in mixing with fondant sugar micro-organisms capable of energetically decomposing sugar and with a salt and an organic acid capable of promoting the growth of said micro-organisms.

4. Process for the production of fermentative substances by the mixture of useful lactic acid bacteria with fondant sugar.

In witness whereof I have signed this specification in the presence of two witnesses.

MATHILDE GROLL.

Witnesses:
RICHARD KOMINIK,
AUGUST FUZZER.